(12) United States Patent
Hsieh et al.

(10) Patent No.: US 7,437,739 B1
(45) Date of Patent: Oct. 14, 2008

(54) SYNCHRONIZING DATA BETWEEN A DATA STORE AND A PROJECT MANAGEMENT CLIENT TOOL

(75) Inventors: Eric Hai-Hsin Hsieh, Irvine, CA (US); Avinash Sadhu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 998 days.

(21) Appl. No.: 10/636,951

(22) Filed: Aug. 6, 2003

Related U.S. Application Data

(63) Continuation-in-part of application No. 10/306,604, filed on Nov. 26, 2002, now Pat. No. 7,155,700, and a continuation-in-part of application No. 10/306,601, filed on Nov. 26, 2002, now Pat. No. 7,159,206, and a continuation-in-part of application No. 10/306,602, filed on Nov. 26, 2002, now Pat. No. 7,174,348.

(60) Provisional application No. 60/456,376, filed on Mar. 20, 2003.

(51) Int. Cl.
*G06F 9/54* (2006.01)
*G06F 15/163* (2006.01)

(52) U.S. Cl. .................................. 719/328; 709/223

(58) Field of Classification Search .............. 709/328; 703/223
See application file for complete search history.

(56) References Cited

U.S. PATENT DOCUMENTS

| | | | | |
|---|---|---|---|---|
| 5,826,252 | A | * | 10/1998 | Wolters et al. ............... 707/1 |
| 6,308,164 | B1 | * | 10/2001 | Nummelin et al. ........... 705/9 |
| 2002/0120638 | A1 | | 8/2002 | Boehmke |
| 2002/0194046 | A1 | | 12/2002 | Sullivan |
| 2003/0217164 | A1 | * | 11/2003 | Cai et al. ................. 709/229 |
| 2004/0015821 | A1 | * | 1/2004 | Lu et al. .................. 717/103 |
| 2004/0083238 | A1 | * | 4/2004 | Louis et al. .............. 707/200 |
| 2005/0027582 | A1 | * | 2/2005 | Chereau et al. ............ 705/9 |

OTHER PUBLICATIONS

Avi Sadhu, Unisys Corporation, Rein In That Monster Of A Process With Modern Web-Based Tools, Project World Conference, San Jose, California, Dec. 13, 2001.

* cited by examiner

*Primary Examiner*—Meng-Ai An
*Assistant Examiner*—Abdou K Seye
(74) *Attorney, Agent, or Firm*—Phuong-Quan Hoang; Robert P. Marley

(57) ABSTRACT

An embodiment of the present invention is a technique to synchronize data between a data store and a project management client tool. An element in a project file is updated according to an event generated by a project tool in a client. A server is communicated by a request to request synchronization of the element. The server has a data store which contains an object corresponding to the element. The request is processed to synchronize the element with the object in the data store.

24 Claims, 10 Drawing Sheets

SYNCHRONIZING DATA BETWEEN A DATA STORE AND A PROJECT MANAGEMENT CLIENT TOOL

CROSS-REFERENCE TO RELATED APPLICATIONS

This application is a continuation-in-part application of the following patent applications: "Creating Customized Objects For Processes In Project Management", Ser. No. 10/306,604, filed on Nov. 26, 2002; now U.S. Pat. No. 7,155,700 "Automated Process Execution For Project Management", Ser. No. 10/306,601, filed on Nov. 26, 2002; now U.S. Pat. No. 7,159,206 "Collaborating Activities Using Customized Objects For Project Management", Ser. No. 10/306,602, filed on Nov. 26, 2002 now U.S. Pat. No. 7,174,348. This application claims the benefit of the provisional application entitled "Project Management Using Customized Objects", Ser. No. 60/456,376 filed on Mar. 20, 2003, and is related to the following patent applications: Ser. No. 10/636,924 entitled "Generation Of Java Language Application Programming Interface For An Object-Oriented Data Store"; Ser. No. 10/636,959 entitled "Capturing Traceability Information Between Artifacts Produced By A Project Management Software"; Ser. No. 10/636,955 entitled "Instantiating A Project In A Project Management System"; Ser. No. 10/636,923 entitled "Automating Document Reviews In A Project Management System"; Ser. No. 10/636,961 entitled "Implementing Web-Based Wizards In Distributed Web Applications"; Ser. No. 10/636,962 entitled "Implementing Complex Client-Side Graphical User Interface Controls In Distributed Web Applications"; Ser. No. 10/636,852 entitled "Tracking Status Of Task In A Project Management Tool"; Ser. No. 10/636,953 entitled "Customizing And Automating Checklists In Project Management"; Ser. No. 10/636,952 entitled "Controlling Access To Projects In A Project Management System"; Ser. No. 10/636,945 entitled "Customizing And Automating Entry And Exit Criteria In A Project Management System"; Ser. No. 10/636,946 entitled "Sending Notifications To Project Members In A Project Management System", all filed on the same date and assigned to the same assignee as the present application, the contents of each of which are herein incorporated by reference.

BACKGROUND

1. Field of the Invention

Embodiments of the invention relate to the field of management software, and more specifically, to project management.

2. Description of Related Art

Project management is becoming more and more complex. In enterprise applications, the sizes of projects are typically quite large, including complex databases and involving a large number of participants. The complex interactions among the various team members, process flows, tools, and databases have created difficulties to project managers. The project manager has to keep track of the progress of the project, communicate with stake holders, during the initiation, planning, executing, controlling, and closing phases of a project. Team members have to use the tools of the trade, exchange ideas, generate and review project documentations and/or reports, update information, communicate with the project manager regarding progress of their work, etc.

Existing techniques for project management have a number of drawbacks. First, most traditional techniques are not convenient to users or team members because of lack of support and/or interface to Web-based information sharing. Second, the project information may not be well structured or organized. Users do not have a common format or platform to organize data or information and trace sources of data and information. Third, workflow/process automation is non-existent.

Typically a project management tool is a part of the project management software. This tool generates and manages only a part of data such as tasks, resources, checklists, etc. in the data store. Other data are generated and managed by the rest of the project management system or application. To maintain data integrity, all of the data need to be synchronized not only when the project is first planned but also during the execution of the project as the project progresses.

SUMMARY OF THE INVENTION

An embodiment of the present invention is a technique to synchronize data between a data store and a project management client tool. An element in a project file is updated according to an event generated by a project tool in a client. A server is communicated by a request to request synchronization of the element. The server has a data store which contains an object corresponding to the element. The request is processed to synchronize the element with the object in the data store.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to synchronize data between a data store and a project management client tool. An element in a project file is updated according to an event generated by a project tool in a client. A server is communicated by a request to request synchronization of the element. The server has a data store which contains an object corresponding to the element. The request is processed to synchronize the element with the object in the data store.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
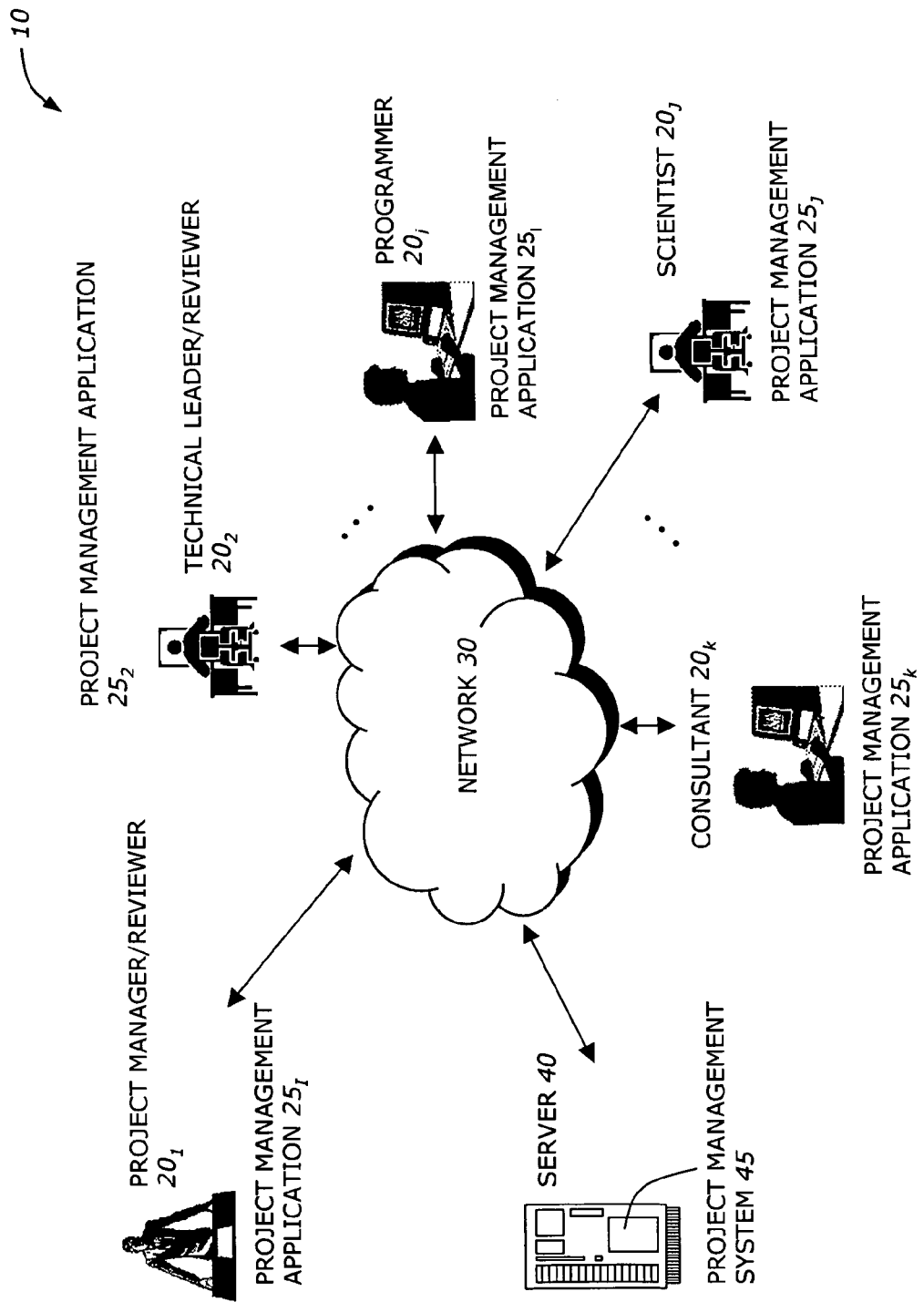
FIG. 1A is a diagram illustrating a project environment in which one embodiment of the invention can be practiced.

FIG. 1A is a diagram illustrating a project environment 10 in which one embodiment of the invention can be practiced. The project environment 10 includes project members $20_1$ to $20_K$, a network 30, and a server 40.

The project members may include a project manager $20_1$, a technical leader $20_2$, a programmer $20_i$, a scientist $20_j$, and a consultant $20_K$. A person may have one or more roles. Each member may be assigned one or more tasks in one or more phases of a project. Each member has access to a project management application $25_i$ to $25_K$, respectively. The project management application may be located in the computer used by the member.

The network 30 may be any suitable network that links the project members $20_1$ to $20_K$. The network 30 may be an Internet, intranet, extranet, wireless fidelity (Wi-Fi), local area network (LAN), wide area network (WAN), etc. The network 30 allows project members to communicate with each other and to access the project management application. The server 40 is connected to the network 30 and contains a project management system 45 that provides the tools for users to construct, create, or instantiate a project.

Figure 1B:
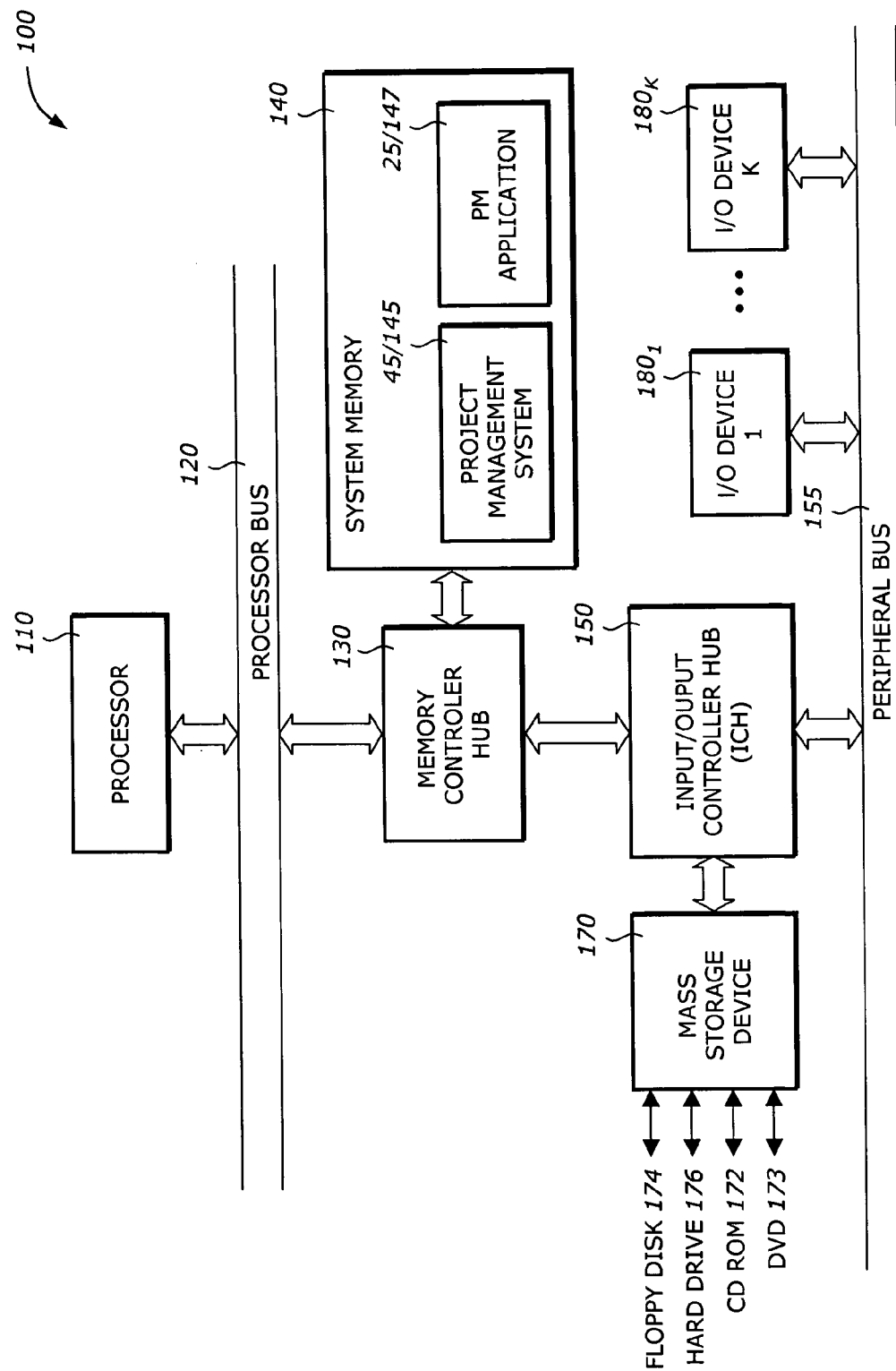
FIG. 1B is a diagram illustrating a computer system according to one embodiment of the invention.

FIG. 1B is a diagram illustrating a computer system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a project management system 45 or application 25. Any one of the elements of the project management system 45 or application 25 may be implemented by hardware, software, firmware, microcode, or any combination thereof. The system memory 140 may also include other programs or data which are not shown, such as an operating system. The project management system 45 or application 25 may implement all or part of the project management functions. The project management system 45 or application 25 may also simulate the project management functions. The project management system 45 or application 25 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
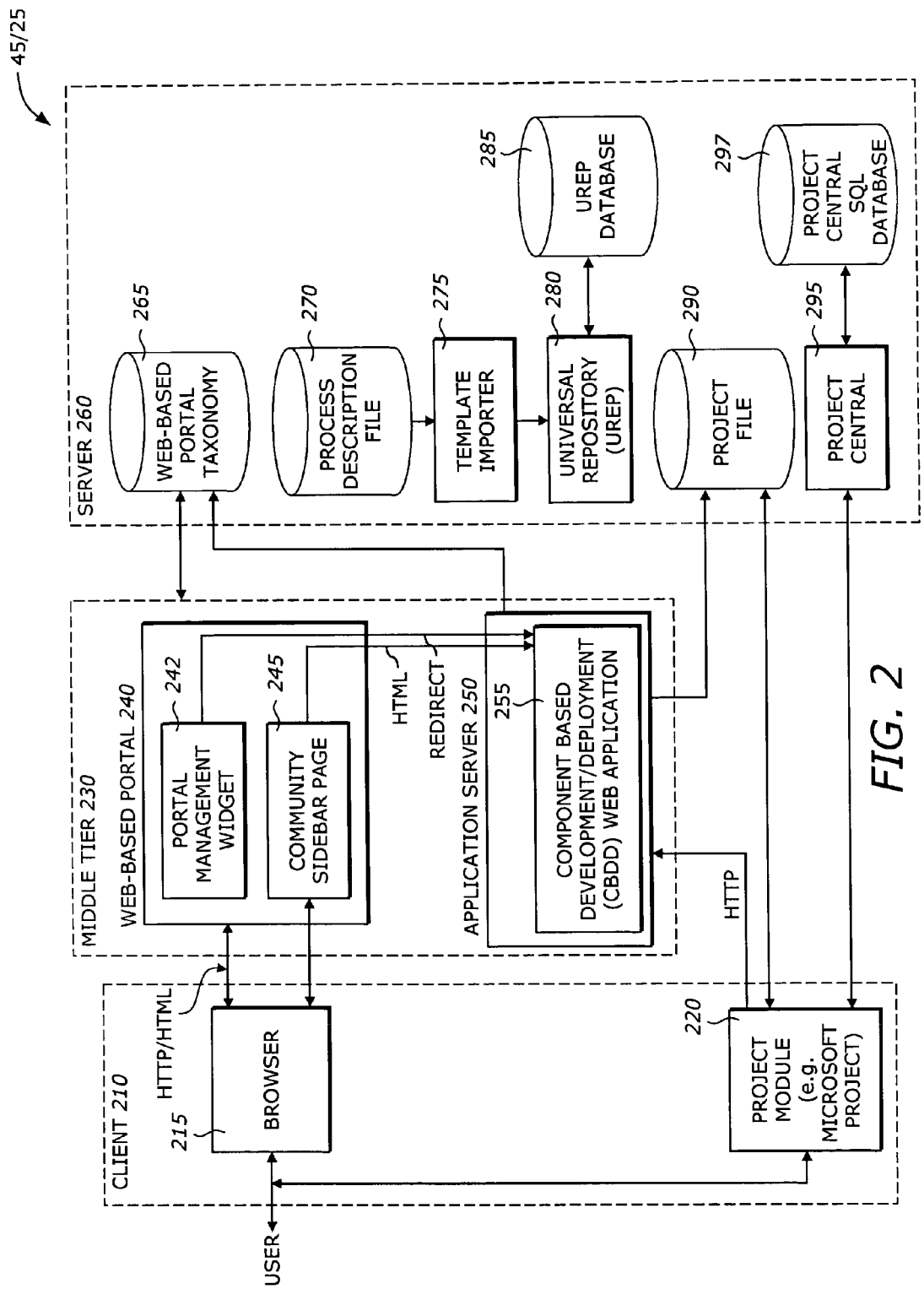
FIG. 2 is a diagram illustrating a project management system/application according to one embodiment of the invention.

FIG. 2 is a diagram illustrating a project management system/application 25/45 according to one embodiment of the invention. The project management system/application 25/45 includes a client 210, a middle tier 230, and a server 260.

The client 210 includes an application accessible to the user or the project team member. The application is typically installed or located at the user's computer system. The client 210 includes a browser 215 and a project module 220. The browser 215 is a Web-based browser that allows the user to navigate the project management system to carry out tasks for project management. The project module 220 is a software or an application designed to provide basic tools for management of projects or workflow. The project module 220 may have any of the following features: creating reports, charts, schedules, calendars; sending and receiving information on project task status and assignment; viewing, editing, and grouping resources; integrating spreadsheets, databases; tracking project progress; etc. In one embodiment, the project module 220 is the Microsoft Project Central, Project 2000 software package.

The middle tier 230 may be implemented at the client 210 or the server 260 and includes a web-based portal 240 and an application server 250. The web-based portal 240 provides tools to manage links for navigation in a Web-based environment. The web-based portal 240 includes a portal management widget 242 and a community sidebar page 245. The portal management widget 242 is in essence a Hyper-Text Markup Language (HTML) file that contains HTML code. It is a set of related links that can appear on a user's portal page and provides links to other components, such as project frame set page when used for portal maintenance, and new project web wizard for initial project configuration. The community sidebar page 245 provides links to the project module database, and to the project frame set page when used for on-going project management. The application server 250 is an enterprise software that provides application infrastructure for the overall project management system such as CBDD. It serves as an interface layer between the user interface and the system databases and/or other server components. In one embodiment, the application server 250 is the WebLogic server which provides basic application server functions and services such as transaction management, security, messaging, database connectivity, resource pooling, etc. Typically, the application server 250 is fully compliant with the industry standard, such as Java 2 Enterprise Edition (J2EE) version 1.3, and is portable across various hardware and operating systems including UNIX, Linux, Windows, etc. The application server 250 supports programming standards to build an application infrastructure, including eXtensible Markup Language (XML), Simple Object Access Protocol (SOAP), Web Services Definition Language (WSDL), etc. The CBDD web application 255 uses the services of the application server 250 to provide a user interface and application logic for the present invention.

The server 260 provides functions at the server side. The server 260 includes a web-based portal taxonomy 265, a process description file 270, a template importer 275, a universal repository (UREP) 280, a UREP database 285, a project file 290, a central project module 295, and a project database 297. The web-based portal taxonomy 265 provides tools to create or publish documents to any topic of the newly generated taxonomy. The taxonomy generation may include generation of elements for various phases in a project such as requirement phase, feasibility phase, design phase, development phase, integration and qualification phase, and support phase. The process description file 270 includes files that are created by user to describe elements of the project. The template importer 275 is a utility to import a process template into the UREP 280 and create the corresponding objects and references needed to represent that process in the UREP 280. The template importer 275 is also used to import global data which are not project-related. Examples of global data include module level notifications and global access control functions. In one embodiment, the process template data is expressed as a XML file. The UREP 280 is a metadata database, a data store, or repository information model that defines the information that can be stored in the repository database 285. It may also identify the services, tool, and technology models supported by the system. The UREP database 285 is a metadata database that stores the repository information. Note that the term repository refers to any type of data store, storage, database, etc.

The project file 290 is a directory that saves generated project files. The project file is used to manage tasks, assignments, and schedules inside the project module 220. The central project 295 is a project management software module that is located at the server. The project central database 297 stores files, information, and data used by the central project 295. In one embodiment, the central project 295 is the Microsoft Project Central.

Figure 3:
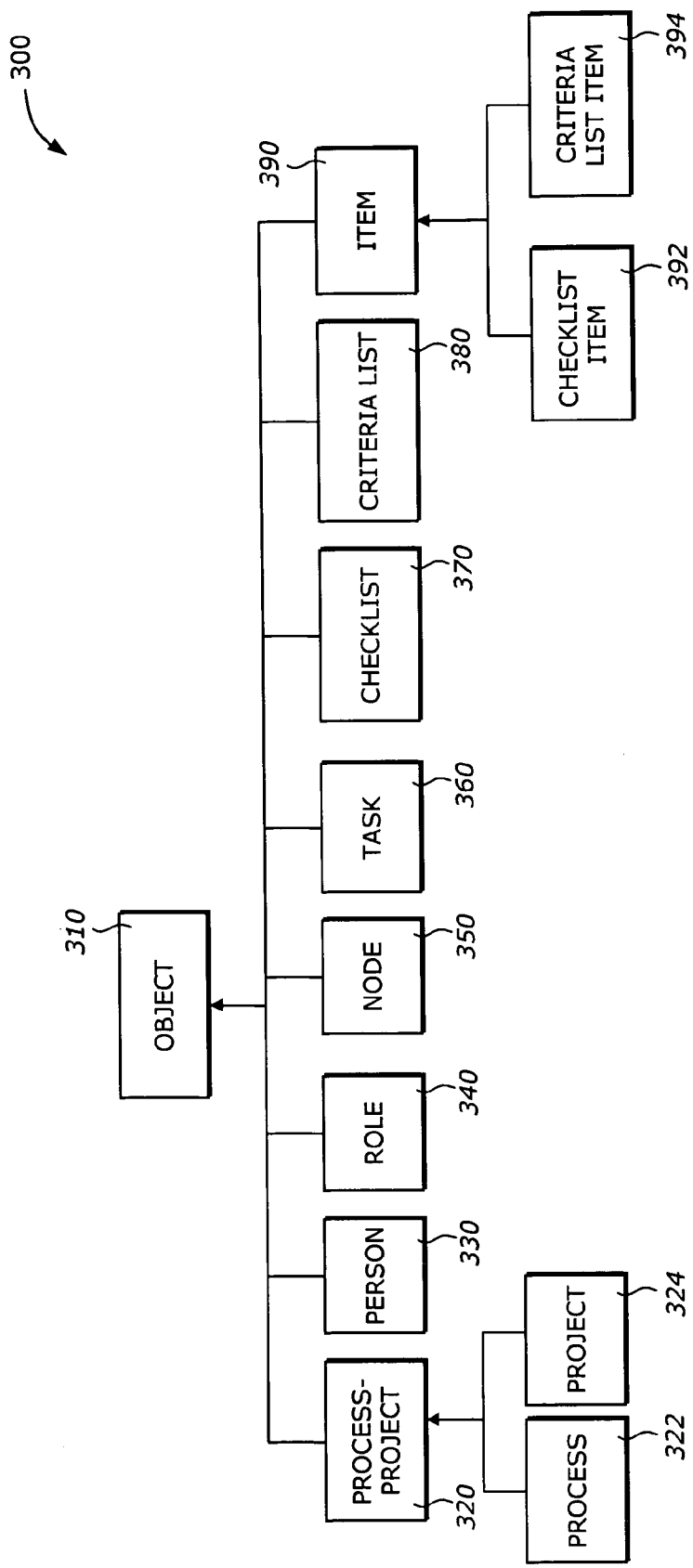
FIG. 3 is a diagram illustrating a hierarchical project model according to one embodiment of the invention.

FIG. 3 is a diagram illustrating a hierarchical project model 300 according to one embodiment of the invention. The hierarchical project model 300 is a CBDD repository model that stores the process and project configurations. It includes several supertypes or types defined for the project management. In one embodiment, these types include a supertype Object 310, a type Process-Project 320, a type Person 330, a type Role 340, a type Node 350, a type Task 360, a type CheckList 370, a type CriteriaList 380, and a type Item 390. The type Process-Project 320 has a subtype Process 322 and a subtype Project 324. The type Item 390 has a subtype CheckList Item 392 and a subtype CriteriaList Item 394.

The supertype Object 310 allows common features, such as name, to be defined once for its subtypes.

The type Process-Project 320 is a supertype of the Process 322 and the Project 324. It allows common features of these types to be defined once. The Process 322 represents a complete or entire process used to run a project. Usually, a process is defined once and is used for many projects. The Project 324 models a real-world project that the team is working on. Person 330 represents a person, a team member, a user, a project member, or an entity who is assigned to carry out a project task. The Role 340 models similar jobs or roles performed by various project members. Examples of roles are programmer, technician, project manager, draftsman, etc. The Node 350 represents a phase, a category, or an activity of a project. The Task 360 represents the actual work items that project members carry out. Examples of tasks are installation of test routines, verification of algorithm correctness, optimization of codes, etc. Tasks typically belong to a particular phase represented by the Node 350. CheckList 370 provides for lists of items that are checked off as a project is completed. The CriteriaList 380 provides for lists of entry and exit criteria that are accomplished before a project transitions from one phase to another phase. The Item 390 provides a supertype for the CheckList Item 392 and the CriteriaList Item 394. It allows common features of these types to be defined once. The CheckList Item 392 represents the individual checklist items contained in a checklist. The CriteriaList Item 394 represents the individual criteria contained in a criteria list. The criteria may include entry and exit criteria.

The project management system includes a project management tool to perform part of the generation and management of project elements. The project elements or objects in the UREP 280 and UREP database 285 shown in FIG. 2 need to be synchronized with the project elements managed by the project management tool in the project module 220 shown in FIG. 2 at the beginning of the project and during the course of the project development. Synchronization here refers to the process to keep track of changes or creations of files, documents, entities, etc. The result of the synchronization is that the project elements are updated on both the client side and the server side such that the elements in the repository, data store, or the UREP are the same as those maintained and managed by the project management tool. At the end of project instantiation, a project file is generated based on the project data in the data store or UREP database 285. The project file is then used in conjunction with the central project 295 to manage the project's assignments, schedule and resources. When changes are made to the project file in the project module 220, they need to be updated in the data store or UREP database 285 as necessary.

Figure 4:
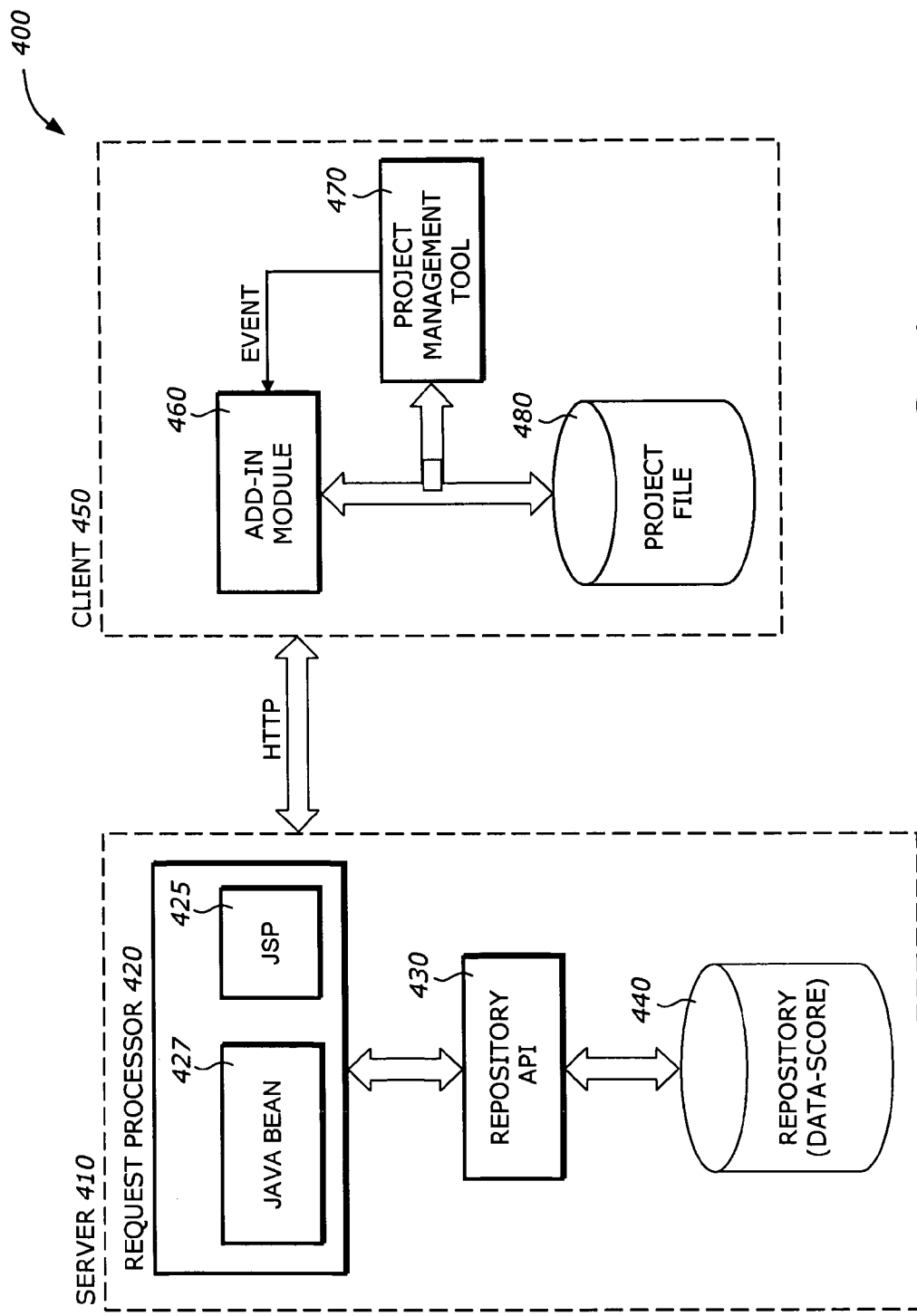
FIG. 4 is a diagram illustrating a synchronization model according to one embodiment of the invention.

FIG. 4 is a diagram illustrating a synchronization model 400 according to one embodiment of the invention. The synchronization module 400 includes a server 410 and a client 450.

The server 410 includes a request processor 420, a repository API 430, and a repository or data store 440. The repository API 438 and the repository 440 are essentially similar to the UREP 280 and the UREP database 285, respectively. The client 450 is essentially equivalent to the project module 220 shown in FIG. 2. It includes an add-in module 460, a project management tool 470 and a project file 480. In one embodiment, the project management tool 470 is the Microsoft Project 200. The add-in module 460 provides the interface necessary to synchronize the data or project elements in the project file 480 with the data or objects in the repository 440.

The add-in module 460 performs two basic functions: (1) updating the project elements in the project file 480, and (2) communicating with the server. In one embodiment, it is a COM add-in to the Microsoft Project 2000. It is implemented as a COM DLL as required by the Project 2000 COM add-in architecture. Once the DLL is properly registered, it can be loaded into the MS Project 2000 GUI. The COM add-in module 460 can perform a wide range of tasks, including: (1) Add new menus and menu items, (2) Add new toolbars and toolbar buttons, (3) Listen for application events and register even handlers for those events, (4) Display custom forms and dialogs, and (5) Automate existing functions of MS Project through the MS Project COM API.

The add-in module 460 listens to the events generated by the project management tool 470. It accesses the project elements in the project file 480 and transform these into actions in an action list. It then communicates with the server 410 to send protocol requests which contain information for updating or synchronizing the project elements, including the action list.

The request processor 420 in the server 410 is responsible for processing the protocol requests sent by the add-in module 460. It calls methods in the repository API 430 to update objects in the repository 440 corresponding to the project elements that need to be synchronized in the action list. It includes a single JSP 425 and JavaBeans 427. All server side processing is implemented using JSP pages. The single JSP page 425 is implemented to receive and process the initial action request sent from the Add-in module 460. A separate JavaBean as part of JavaBeans 427 is implemented to perform the actual processing for each action. The JSP makes the appropriate method calls on the bean based on the type of action that was requested. When the bean finishes processing, the JSP returns any return data back to the add-in module 460.

Figure 5:
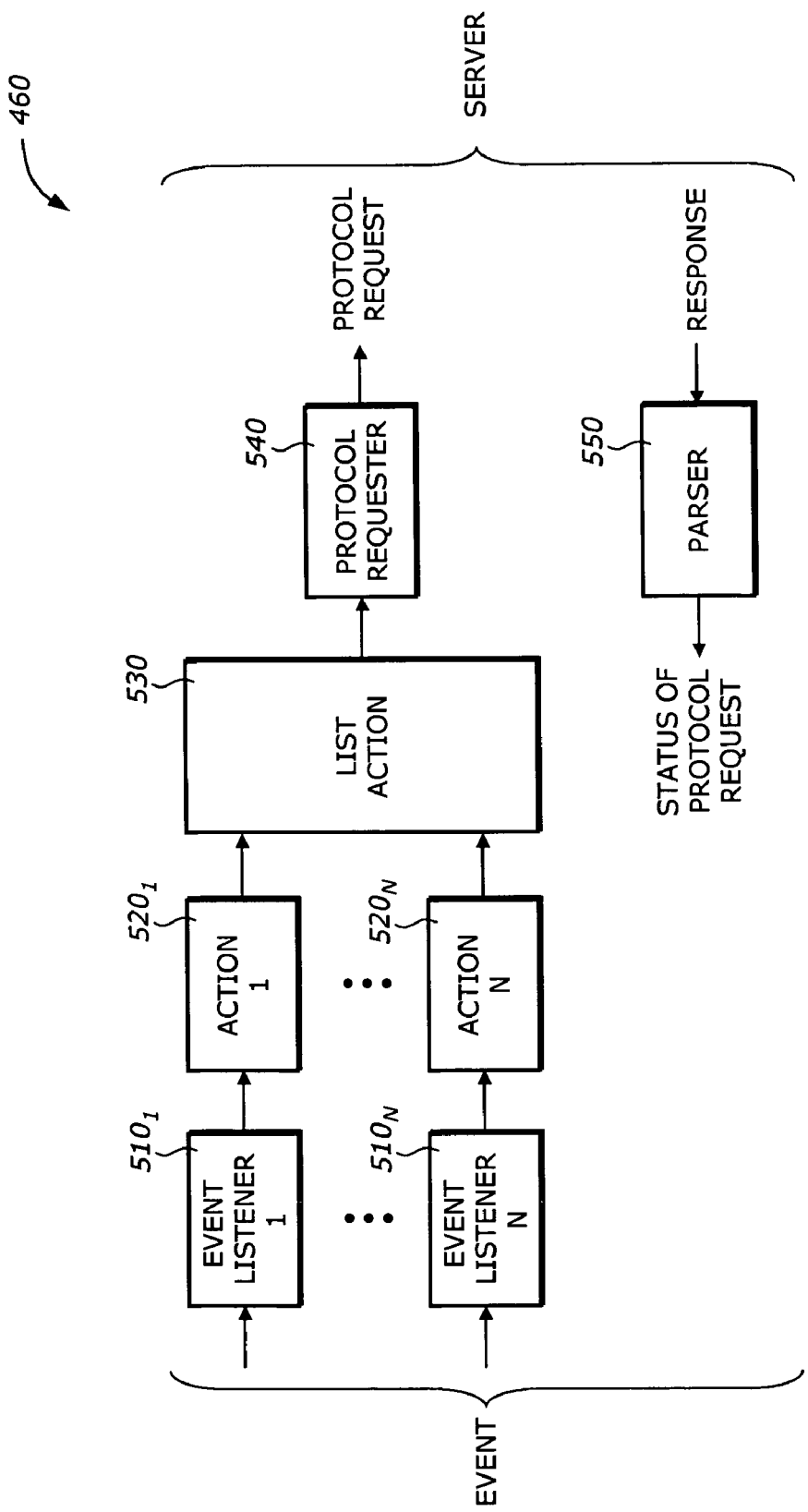
FIG. 5 is a diagram illustrating an add-in module according to one embodiment of the invention.

FIG. 5 is a diagram illustrating the add-in module 460 according to one embodiment of the invention. The add-in module 460 includes N event listeners $510_1$ to $510_N$, actions $520_1$ to $520_N$, an action list 530, a protocol requester 540 and a parser 550.

The event listeners $510_1$ to $510_N$ listen for important application events. Examples of the application events are task created, task modified, resource created, and resource modified events. As these events occur, they are transformed into the actions $520_1$ to $520_N$. The actions $520_1$ to $520_N$ are then saved in a global action list 530. When the user is ready to save the changes and update them to the server, the add-in module 460 goes through each action in the action list 530 and submits the action to the server side processing component via the protocol requester 540. The server side processing component performs the necessary processing to update the action in the repository. The data synchronization is completed when all actions are updated to the server successfully. In order to eliminate any redundant processing on the server, new actions can be merged with existing actions in the action list 530. For example, an action that changes the name of Task X can be merged with an existing action that creates Tasks X. In this case, instead of sending two processing requests to the server (a ChangeTaskName and a NewTask request), only one request is needed (a NewTask request).

The protocol requester 540 transforms the action list 530 into a protocol request. In one embodiment, the actions are transformed into Hypertext Transfer Protocol (HTTP) requests and sent to a specified server. The transformed HTTP requests are in the form of a Uniform Resource Locator (URL) query string:

http://servername:port/../
JSPpage?param1=value1&param2=value2 . . . .

The user specifies the server name and port number to be used as part of the add-in settings. Each attribute of an action is transformed as a parameter list and is appended to the end of the query string. The protocol requester 540 then sends this query string as an HTTP request via the Internet Transfer ActiveX Control. The server side JSP processes the request and sends back any return data to the add-in module 460 as HTTP responses. The parser 550 parses the HTTP response in order to determine the status of the request (successful or error) as well as obtain the necessary returned data.

A project element to be synchronized may be a task or a resource. There are two basic synchronizations: a task synchronization and a resource synchronization.

Tasks in the project file correspond to task objects in the repository. Summary tasks, or parent tasks, correspond to node objects in the repository. Any changes made to these two types of tasks in the project file are reflected accordingly in the repository.

All tasks that appear in the project file also store the identifier of their corresponding object in the repository, except newly created tasks, which will receive their identifier when they get synchronized to the repository. The initial project file is generated such that each original task in the project has their identifier stored in their Text1 attribute. The Text1 attribute is a user defined field of a project task, therefore it is not used by the project management tool and is free to be used by the user. There are three basic task operations: create task, delete task, and modify task.

Create Task: As tasks get created in the project file, the add-in module 460 keeps track of them and creates the corresponding task and node objects in the repository. Depending on the type of task that is created as well as the position of the task relative to the overall hierarchy, the add-in module 460 performs slightly different operations to be able to correctly reflect the new tasks in the repository model. There are three basic types of tasks: summary tasks, first level summary tasks, and sub tasks.

Summary tasks are tasks that have child sub tasks. Summary tasks are used to group related tasks and act as place holders in the overall task hierarchy. In the repository model, summary tasks correspond to node objects and are associated to other node objects and task objects. In order to create a summary task as a Node in the Repository, the Add-in requires: (1) The name of the new summary task, and (2) The identifier of the parent of the new summary task. The processing JSP uses the name to construct a new node object and links it to its parent node using the parent identifier. The JSP then returns the identifier of the newly construct node object back to the add-in module 460 as the response and the identifier is stored in the Text1 attribute of the new summary task.

First level summary tasks are summary tasks that do not have a parent. In the repository model, first level summary tasks correspond to node objects that are directly associated to the project object. Because of this, the add-in module 460 treats these summary task as a special case when updating them to the repository. In order to create a first level summary task as a node in the repository, the add-in module 460 requires the name of the new summary task and the identifier, or name, of the project. The processing JSP uses the name to construct a new node object and links it to its parent project using the project identifier or name. The JSP then returns the identifier of the newly constructed node object back to the add-in module 460 as the response and the identifier is stored in the Text1 attribute of the new summary task.

Sub tasks are tasks that do not have any children. Sub tasks correspond to task objects in the repository and are associated to a single node object which is the parent of the tasks (the summary task). In order to create a sub task as a task object in the repository, the add-in module 460 requires the name of the new sub task and the identifier of the parent of the sub task The processing JSP uses the name to construct a new task object in the repository and links it to its parent node object using the parent identifier. The JSP then returns the identifier of the newly constructed Task object back to the Add-in as the response and the identifier is stored in the Text1 attribute of the new sub task.

Delete Task: As tasks get deleted in the project file, the Add-in module 460 keeps track of the deleted tasks and delete their corresponding objects in the repository as well. When a sub task is deleted, the add-in module 460 deletes its corresponding task object in the repository. In order to delete a sub task in the repository, the add-in module 460 requires the identifier of the sub task. The processing JSP deletes the task object using identifier of the sub task. When a summary task is deleted, the add-in module 460 deletes its corresponding node object in the repository. In addition, when a summary task is deleted, Project 2000 also deletes all its children sub tasks; therefore the add-in module 460 also performs a delete task operation for each sub task that is deleted. In order to delete a summary task in the repository, the add-in module 460 requires the identifier of the summary task The processing JSP deletes the node object using the identifier of the summary task. The children sub tasks of the summary task are deleted according to the processing of deleting sub tasks as described in the section above.

Modify Task: When certain attributes of a task have been modified, the changes are also reflected in the repository. There are two situations for modifying tasks: when a task is renamed and is completed. Tasks that are renamed in the project file are also renamed in the repository. In order to rename a task in the repository, the add-in module 460 requires the new name of the task and the identifier of the task. The processing JSP renames the task (or node) object in the repository using the new name and identifier of the task. When tasks get completed (100% complete in Project terms) in the project file, their completion status may also be updated in the repository. This is needed because the Criteria and Checklists in the repository keep track of the completion status of their associated tasks and will take certain actions as their tasks are completed (send notification, etc. . . . ). In order to mark a task complete in the repository, the add-in module 460 requires the identifier of the completed task. The processing JSP changes the task object's status to complete in the repository and calls the processing function from Criteria and Checklist to perform their necessary operations when a task is completed.

Resources in the project file correspond to person objects in the repository. Changes made to resources in the project file are reflected accordingly in the repository. Note that in the project management tool, there may be many different types of resources. In one embodiment, the add-in module 460 is concerned with resources that represent the team members of the project. All resources that appear in the project file also store the identifier of their corresponding Person object in the repository (except newly created resources, which will receive their identifier when they get synchronized to the repository). The initial project file is generated such that each original resource in the project has their identifier stored in their Text1 attribute. The Text1 attribute is a user defined field of a project resource, therefore it is not used by the project management tool and is free to be used by the user.

Create Resource: As new resources get created in the project file, the add-in module 460 must keep track of them and update them to the repository to create their corresponding Person objects. In order to create a new resource in the repository, the add-in module 460 requires: the name of the new resource, the NT account name of the new resource, and the identifier (or name) of the project. The processing JSP uses the name to construct a new Person object in the repository and links it to its parent Project object using the project identifier. The JSP then returns the identifier of the newly constructed Person object back to the add-in module 460 as the response and the identifier is stored in the Text1 attribute of the new resource. By default, new Person objects created in the repository will not be assigned any roles. To assign roles to new Persons, the user may do so through the Project Management web interface.

Delete Resource: When resources get deleted in the project file, the add-in module 460 keeps track of them and delete their corresponding objects in the repository. In order to delete a resource in the Repository, the add-in module 460 requires the identifier of the resource.

Modify Resource: When certain attributes of a resource gets modified, the changes are also reflected in the repository. There are two situations that a resource may be modified: when it is renamed and when the NT account name is changed.

Resources that are renamed in the project file are also renamed in the repository. In order to rename a resource in the repository, the add-in module 460 requires the new resource name and the identifier of the resource. The processing JSP renames the Person object using the identifier and the new name.

Each Person object in the repository has an associated UrepUser object which stores the NT login ID of the Person. When the NT account name of a resource gets modified in the project file, the change must be reflected in the UrepUser object in the repository. To change the NT account name in the repository, the add-in module 460 requires the new NT account name and the identifier of the resource. The processing JSP finds the correct Person object and its associated UrepUser object in the repository using the identifier and renames the login id to the new NT account name.

Action Merging Rules: In order to eliminate redundant processing on the server, when multiple Actions are performed on the same task or resource, the add-in module 460 can merge various Actions together. The merging of Actions is based on a set of merging rules, as shown in Table 1.

TABLE 1

| New Action | Existing Action | Merged Action |
|---|---|---|
| Operation: Rename Task | Operation Create Task | Operation Create Task |
| Name: New Name 2 | Name: New Name | Name: New Name 2 |
| Operation: Delete Task | Operation: Create Task | Cancelled |
| Operation: Rename Resource | Operation: Create Resource | Operation: Create Resource |
| Name: New Name 2 | Name: New Name | Name: New Name 2 |
| Operation: Delete Resource | Operation: Create Resource | Cancelled |
| Operation: Modify Resource | Operation: Modify Resource | Operation: Modify Resource |
| NT Account: New Account 2 | NT Account: New Account | NT Account: New Account 2 |

Figure 6:
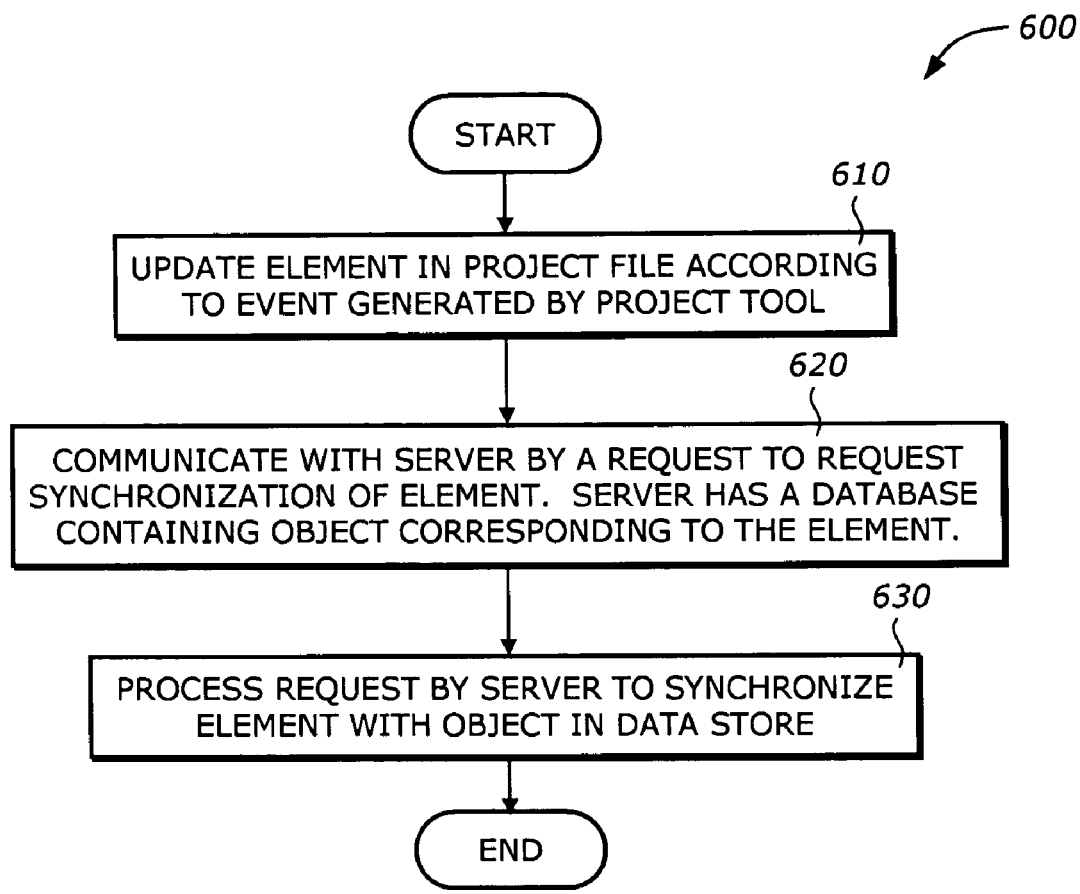
FIG. 6 is a flowchart illustrating a process to synchronize project elements according to one embodiment of the invention.

FIG. 6 is a flowchart illustrating a process 600 to synchronize project elements according to one embodiment of the invention.

Upon START, the process 600 updates an element in a project file according to an event generated by a project tool in a client (Block 610). The element may be a task or a resource, or any other element in a project. Then, the process 600 communicates with a server having a data store by a request to request synchronization of the element (Block 620). The data store contains an object corresponding to the element. Next, the process 600 processes the request to synchronize the element with the object in the data store (Block 630) and is then terminated.

Figure 7:
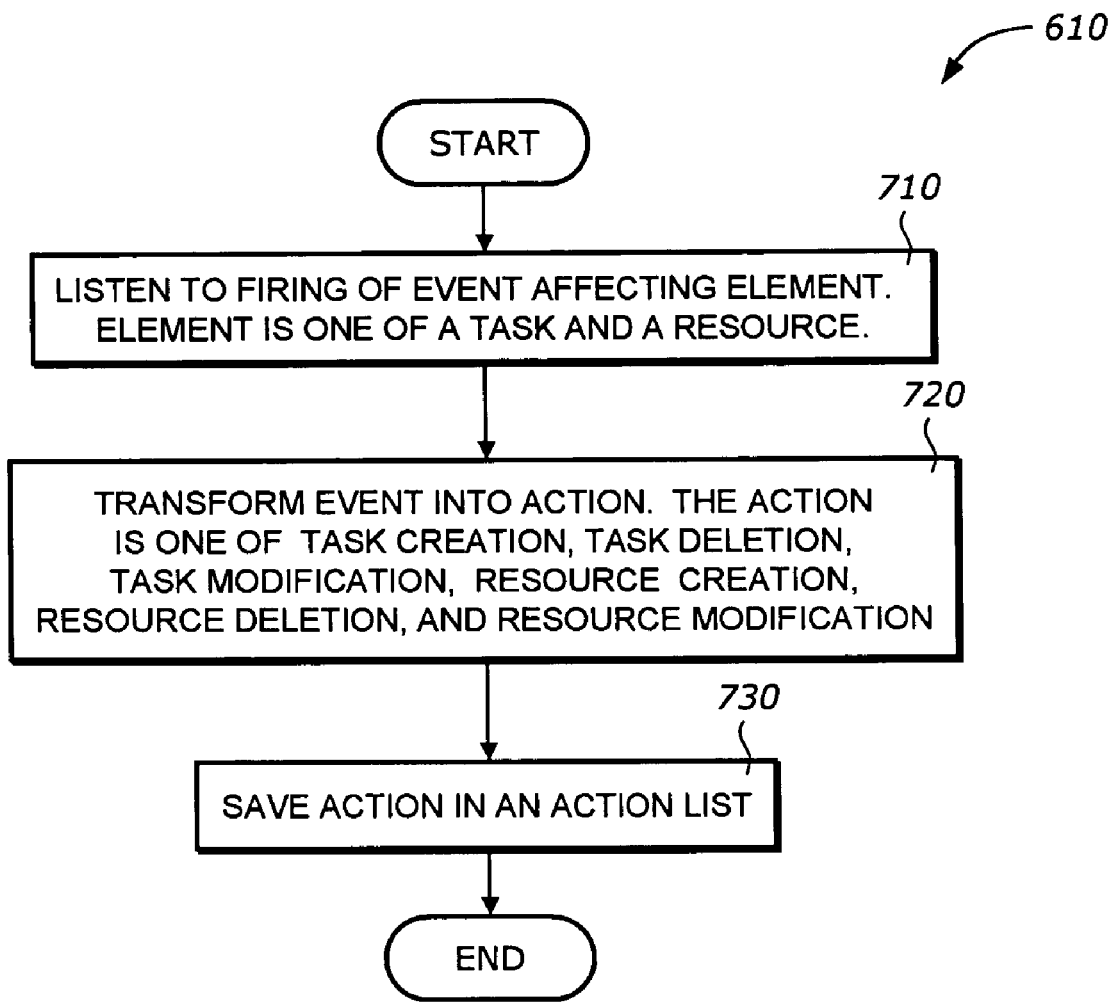
FIG. 7 is a flowchart illustrating a process to update an element according to one embodiment of the invention.

FIG. 7 is a flowchart illustrating a process 610 to update an element according to one embodiment of the invention.

Upon START, the process 610 listens to a firing of the event affecting the element (Block 710). Then, the process 610 transforms the event into an action (Block 720). The action may be any one of a task creation, a task deletion, a task modification, a resource creation, a resource deletion, and a resource modification. Next, the process 610 saves the action in an action list (Block 730) to be sent to the server and is then terminated.

Figure 8:
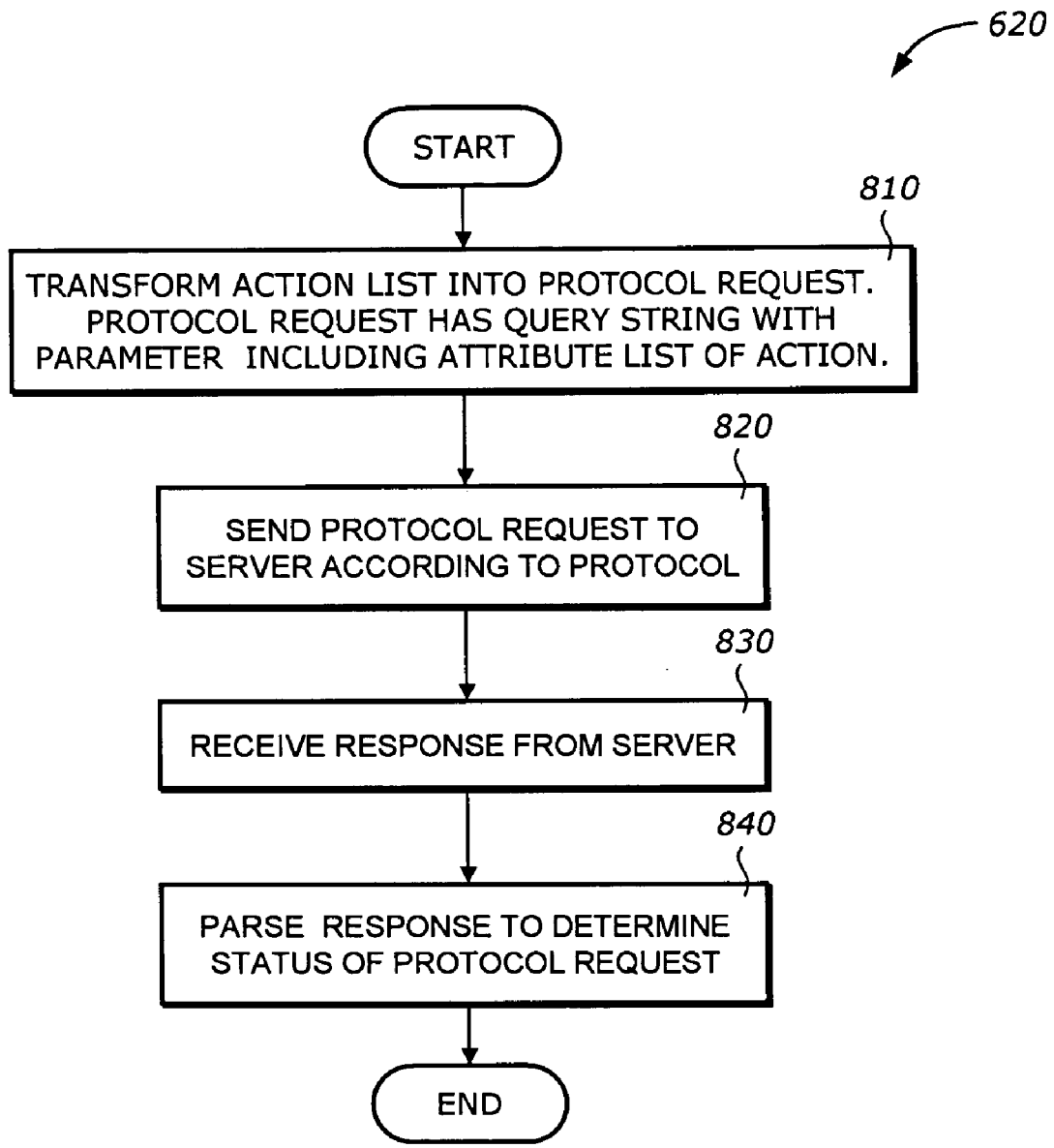
FIG. 8 is a flowchart illustrating a process to communicate with a server according to one embodiment of the invention.

FIG. 8 is a flowchart illustrating a process 620 to communicate with a server according to one embodiment of the invention.

Upon START, the process 620 transforms the action list into a protocol request (Block 810). The protocol request has a query string with a parameter list including an attribute of the action. Then, the process 620 sends the protocol request to the server according to a protocol (Block 820). Next, the process 620 receives a response from the server (Block 830). Then, the process 620 parses the response to determine status of the protocol request (Block 840) and is then terminated.

Figure 9:
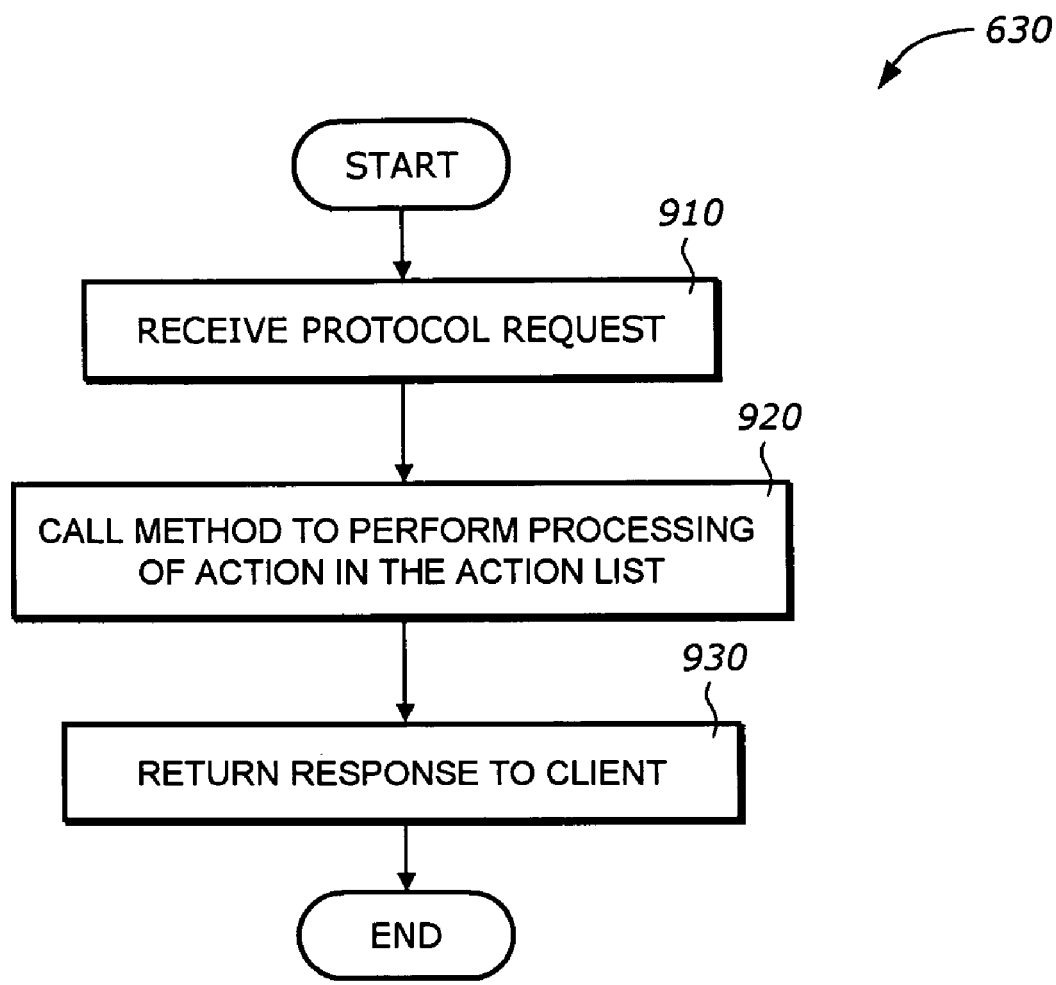
FIG. 9 is a flowchart illustrating a process to process a request according to one embodiment of the invention.

FIG. 9 is a flowchart illustrating a process 630 to process a request according to one embodiment of the invention.

Upon START, the process 630 receives the protocol request (Block 910). This may be implemented by a JSP. Next, the process 630 calls a method to perform a processing of the action (Block 920). This may be performed by a JavaBean. Then, the process 630 returns a response to the client (Block 930) and is next terminated. The response may be a status or any data that may be used by the client.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   listening to a project tool to identify the firing of an event associated with an element, the element being one of a task and a resource stored in a project file on a client;
   requesting synchronization of the element with an object in a data store on a server, the object corresponding to the element; and,
   synchronizing the element with the object in the data store, the synchronizing comprising:
      transforming the event into an action;
      saving the action in an action list;
      sending the action list to the server, sending the action list to the server comprising transforming the action list into a protocol request, the protocol request having a query string with a parameter list including an attribute of the action; and sending the protocol request to the server according to a protocol;
      receiving a response from the server; and
      parsing the response to determine status of the protocol request.

2. The method of claim 1, the event being fired when the element is updated.

3. The method of claim 1 wherein the action comprises one of creation, deletion, and modification of the element.

4. The method of claim 1, wherein sending the protocol request comprises:
   sending the protocol request to a request processor running on the server such that the server can call a method to process the action.

5. The method of claim 4 wherein the request processor comprises a server-side page.

6. The method of claim 4 wherein the request processor comprises a server-side bean.

7. The method of claim 1 wherein sending the protocol request comprises sending the protocol request to the server according to a Hypertext Transfer Protocol (HTTP) protocol.

8. The method of claim 1, the event being identified by an add-in module and the request being made by the add-in module.

9. An article of manufacture comprising:
   a computer memory comprising data stored thereon, the data, when accessed by a machine, causing the machine to perform operations comprising:
      listening to a project tool to identify the firing of an event associated with an element, the element being one of a task and a resource stored in a project file on a client;
      requesting synchronization of the element with an object in a data store on a server, the object corresponding to the element; and,
      synchronizing the element with the object in the data store, the synchronizing comprising:
         transforming the event into an action;
         saving the action in an action list;
         sending the action list to the server, the sending comprising transforming the action list into a protocol request, the protocol request having a query string with a parameter list including an attribute of the action; and sending the protocol request to the server according to a protocol;
         receiving a response from the server; and
         parsing the response to determine status of the protocol request.

10. The article of manufacture of claim 9, the event being fired when the element is updated.

11. The article of manufacture of claim 9 wherein the action comprises one of creation, deletion, and modification of the element.

12. The article of manufacture of claim 9, wherein sending the protocol request comprises:
   sending the protocol request to a request processor running on the server such that the server can call a method to process the action.

13. The article of manufacture of claim 12 the request processor comprises a server-side page.

14. The article of manufacture of claim 12 wherein the request processor comprises a server-side bean.

15. The article of manufacture of claim 9 wherein sending the protocol request comprises sending the protocol request to the server according to a Hypertext Transfer Protocol (HTTP) protocol.

16. The article of manufacture of claim 9, the event being identified by an add-in module and the request being made by the add-in module.

17. A system comprising:
   a processor; and
   a memory coupled to the processor, the memory containing instructions that, when executed by the processor, causes the processor to:
      listen to a project tool to identify the firing of an event associated with an element, the element being one of a task and a resource stored in a project file on a client;
      request synchronization of the element with an object in a data store on a server, the object corresponding to the element; and,
      synchronize the element with the object in the data store, the synchronizing comprising:
         transforming the event into an action;
         saving the action in an action list;
         sending the action list to the server, the sending comprising transforming the action list into a protocol request, the protocol request having a query string with a parameter list including an attribute of the action; and sending the protocol request to the server according to a protocol;
         receiving a response from the server; and
         parsing the response to determine status of the protocol request.

18. The system of claim 17, the event being fired when the element is updated.

19. The system of claim 18 wherein the action comprises one of creation, deletion, and modification of the element.

20. The system of claim 17 wherein the instructions causing the processor to send the protocol request comprises instructions that, when executed by the processor, causes the processor to:
   send the protocol request to a request processor running on the server such that the server can call a method to process the action.

21. The system of claim 20 wherein the request processor comprises a server-side page.

22. The system of claim 20 wherein the request processor comprises a server-side bean.

23. The system of claim 17 wherein the instructions causing the processor to send the protocol request comprises instructions that, when executed by the processor, causes the processor to: send the protocol request to the server according to a Hypertext Transfer Protocol (HTTP) protocol.

24. The system of claim 17, the event being identified by an add-in module and the request being made by the add-in module.

* * * * *